United States Patent
Kawamura et al.

[11] Patent Number: 5,812,519
[45] Date of Patent: Sep. 22, 1998

[54] ROM-RAM DISK

[75] Inventors: Akira Kawamura, Hachiouji; Yasuaki Morimoto, Sakura, both of Japan; Friedhelm Zucker, Villigren-Schwenningen, Germany

[73] Assignee: Deutsche Thomson-Brandt GmbH, Villingen-Schwenningen, Germany

[21] Appl. No.: 647,993
[22] PCT Filed: Nov. 23, 1994
[86] PCT No.: PCT/EP94/03869
   § 371 Date: Sep. 20, 1996
   § 102(e) Date: Sep. 20, 1996
[87] PCT Pub. No.: WO95/15557
   PCT Pub. Date: Jun. 8, 1995
[51] Int. Cl.$^6$ .................................................. G11B 7/24
[52] U.S. Cl. .................. 369/275.1; 369/275.2; 369/275.3
[58] Field of Search .............. 369/275.2, 275.1, 369/275.3, 275.4, 14, 273, 272, 280, 288, 58

[56] References Cited

U.S. PATENT DOCUMENTS

| | | | |
|---|---|---|---|
| 4,769,802 | 9/1988 | Tatsuguchi | 369/275.3 |
| 5,138,598 | 8/1992 | Sako et al. | 369/275.3 |
| 5,150,339 | 9/1992 | Ueda et al. | 369/275.2 |
| 5,214,627 | 5/1993 | Nakashima et al. | 369/32 |
| 5,218,599 | 6/1993 | Tsuyoshi et al. | 369/275.1 |
| 5,241,531 | 8/1993 | Ohno et al. | 369/275.2 |
| 5,448,535 | 9/1995 | Fujita et al. | 369/13 |
| 5,450,379 | 9/1995 | Fujimori et al. | 369/275.1 |
| 5,497,367 | 3/1996 | Yamagami et al. | 369/275.2 |

FOREIGN PATENT DOCUMENTS 0309721   8/1988   European Pat. Off. .

*Primary Examiner*—Tan Dinh
*Attorney, Agent, or Firm*—Joseph S. Tripoli; Frederick A. Wein

[57] ABSTRACT

The invention concerns a high storage capacity ROM-RAM disk and a process for reading and writing to the ROM-RAM disk. T he aim of the invention is to devise a ROM-RAM disk and a process making it possible to read ROM and RAM simultaneously, to read the ROM area and at the same time write to the RAM area and to provide the largest possible volume of memory. The invention comprises two alternative designs. In a first design a ROM-RAM disk contains an area having both ROM and RAM memory structures as of a certain radius or diameter, establishing therein, at a constant rotational speed, a scanning/writing speed which ensures a reading/separation of the data stored in the ROM-RAM structures. In a second design, the available storage area is taken up entirely by a ROM-RAM storage area, where RAM memory structures have a reduced data rate in order to form, a length of memory structures necessary for separating the data stored in the ROM-RAM storage area.

4 Claims, 2 Drawing Sheets ical recording medium which
ROM-RAM DISK

BACKGROUND

The invention relates to a ROM-RAM disk and a method which makes it possible to read the ROM area and to write to the RAM area at the same time, as well as to read ROM and RAM simultaneously using a scanning unit.

A ROM-RAM disk is an optical recording medium which has memory areas which can only be read and memory areas which can both be read and written to. Memories which can only be read are called ROM or read only memory, and memories which can both be read and written to are called RAM or random access memory. A ROM is implemented on optical information media by means of so-called pits which form a spiral data track in the CD. While, in the case of the CD, a light-reflecting aluminium layer has depressions, so-called pits, which represent the data stored on the disk, the MOD has a magnetic layer in which data can be recorded and from which data can be read by means of different magnetization. Information and bits are likewise stored on a spiral data track in domains having a different magnetization direction. In this case, in contrast to an analogue record disc, the data track is read from the inside to the outside at a constant linear velocity, the so-called CLV.

DE-OS 37 32 875 discloses a recording medium which is in the form of a disk and represents a combination of an optical disk and a magneto-optical disk—a so-called ROM-RAM disk. On this recording medium, data are stored both in pits and in domains in a spiral data track. Since the pits and magnetic domains are arranged one above the other, the memory capacity or the memory volume of the ROM-RAM disk is theoretically equal to the sum of the memory volumes.

In order to be able to store and read the information which is stored on an optical information medium in pits or magnetic domains or in a RAM area or a ROM area, a minimum length of memory structures is required, which length is dependent on the wavelength of the scanning laser beam and the memory principle used. In the case of a laser beam wavelength of 780 nm, which is frequently used for scanning optical information media, the minimum length of a memory structure in the RAM area or in the ROM area is approximately 0.8 µm, in order to implement a maximum memory volume. In order to reproduce information which is stored in the RAM area on a ROM-RAM disk, a minimum length of the recording structure for the RAM information of more than 1.38 µm is required in order to be able to select and read the RAM information from the signal mixture, which consists of ROM information and RAM information. This results in it being necessary to read a ROM area or a RAM area and a ROM-RAM area at a different velocity and in it not being possible simultaneously to read the ROM-RAM area and to read the ROM area and to write to the RAM area at the same time. By increasing the linear velocity CLV, the memory volume of the ROM-RAM disk is necessarily reduced in comparison with the theoretical double memory capacity.

SUMMARY OF THE INVENTION

It is therefore the object of the invention to create a ROM-RAM disk and a method which enable simultaneous reading of ROM and RAM and reading of the ROM area and writing to the RAM area at the same time, as well as a memory volume which is as large as possible.

A ROM-RAM disk is used as the basis, which has ROM and RAM memory areas superimposed in a spiral information track. In order to ensure a memory volume which is as large as possible in the case of an information medium of comparable diameter, despite the longer memory structures and increased linear velocity required to separate the information during reading, either the area of a ROM-RAM disk which has both ROM and RAM memory structures is provided only beyond a diameter beyond which a scanning or writing velocity is reached at a constant rotation speed, which velocity ensures reading and separation of the information stored in ROM and RAM structures, or the entire memory area is provided with a reduced data clock rate for the RAM as well as the ROM-RAM area, which is stored and read using a constant linear velocity. While the first design provides a recording medium which provides either a ROM area or a RAM area in the inner area and a ROM-RAM memory area only beyond a diameter at which a linear velocity is achieved which is required to separate a ROM signal or RAM signal from a ROM-RAM signal mixture at a constant rotation speed, the second design comprises the available memory surface on the information medium being provided entirely as ROM-RAM and being read and stored using a constant linear velocity with a reduced data clock rate for the RAM. The ROM in the ROM-RAM is unchanged. With respect to the first design, it should be noted that the magneto-optic disk is controlled at a constant angular velocity CAV or a constant rotation speed in conjunction with the reading and storing of data in a normal manner, so that the linear velocity increases with the radius. The RAM memory capacity of the ROM-RAM area of the ROM-RAM disk is therefore identical to the memory capacity of a conventional erasable disk despite not starting until a greater diameter, the memory volume of the ROM-RAM disk being increased by the ROM area, and the simultaneous reading of ROM and RAM as well as reading of the ROM area and writing to the RAM area at the same time being possible. The area which has both RAM and ROM memory structure is provided in the case of the first design beyond a diameter at which the linear velocity is preferably at least 1.8 m/s at a constant rotation speed.

The special feature of the method in conjunction with the first design is, in particular, that, in contrast to the ROM of a CD which is scanned at a constant linear velocity, the ROM-RAM information medium is scanned at a constant rotation speed or a constant angular velocity, or the information is recorded at a constant angular velocity, a constant rotation speed of the disk in the region of 500 rpm being used for reading and writing information on a ROM-RAM disk.

The method which is provided in conjunction with the second design comprises, in particular, the ROM-RAM disk being read and written to at a constant linear velocity, this being done by the information being stored and read in the RAM area at a data clock rate which is reduced in comparison with the CD. A known linear velocity in the region of 1.2 m/s is used in this case. In this case, it is possible to operate advantageously in a known manner using a constant linear velocity or CLV, since the required lengthening of the memory structures is achieved using the reduced clock rate.

A comparison of the designs shows that the area which can be used for storage or the memory volume of the second design is further increased over that of the first design and consists of the sum of the original ROM memory capacity and the new RAM memory capacity.

The memory capacity of an information medium which simultaneously contains ROM and RAM memory areas in a spiral track is increased, and simultaneous reading of ROM and RAM as well as reading of the ROM area and writing to the RAM area at the same time using one scanning unit are achieved, particularly as a result of the special design of the recording medium and the use of a constant rotation speed, or by using a constant linear velocity with a reduced data rate for the RAM, in an advantageous manner.

DESCRIPTION OF THE DRAWINGS

The invention is explained in more detail in the following text, with reference to drawings, in which.

DETAILED DESCRIPTION OF THE PREFERRED EMBODIMENTS

Figure 1:
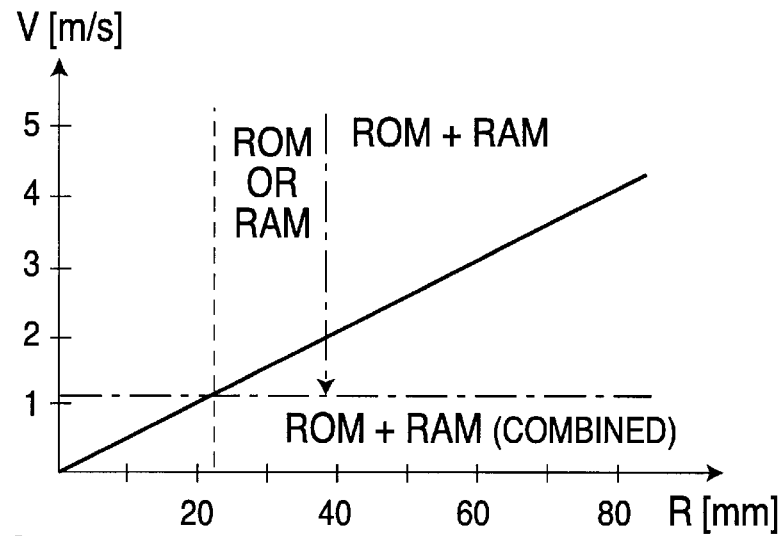
FIG. 1 shows a diagram of the linear velocity.
Figure 2:
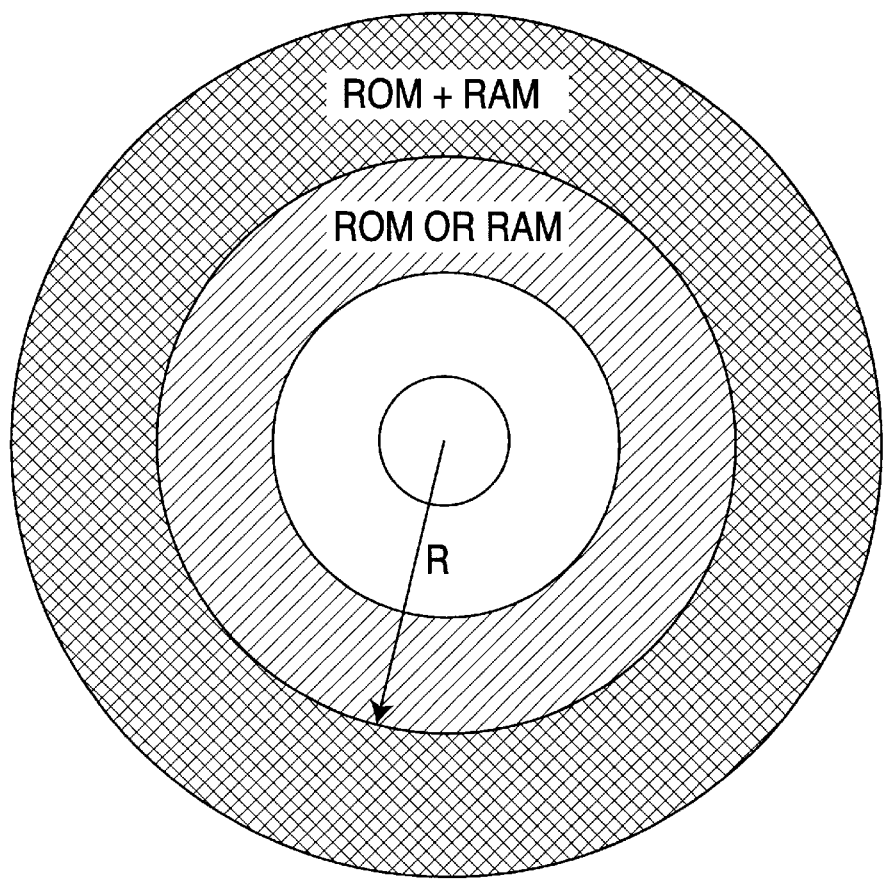
FIG. 2 shows an outline sketch of the memory area distribution of a first ROM/RAM information medium.
Figure 3:
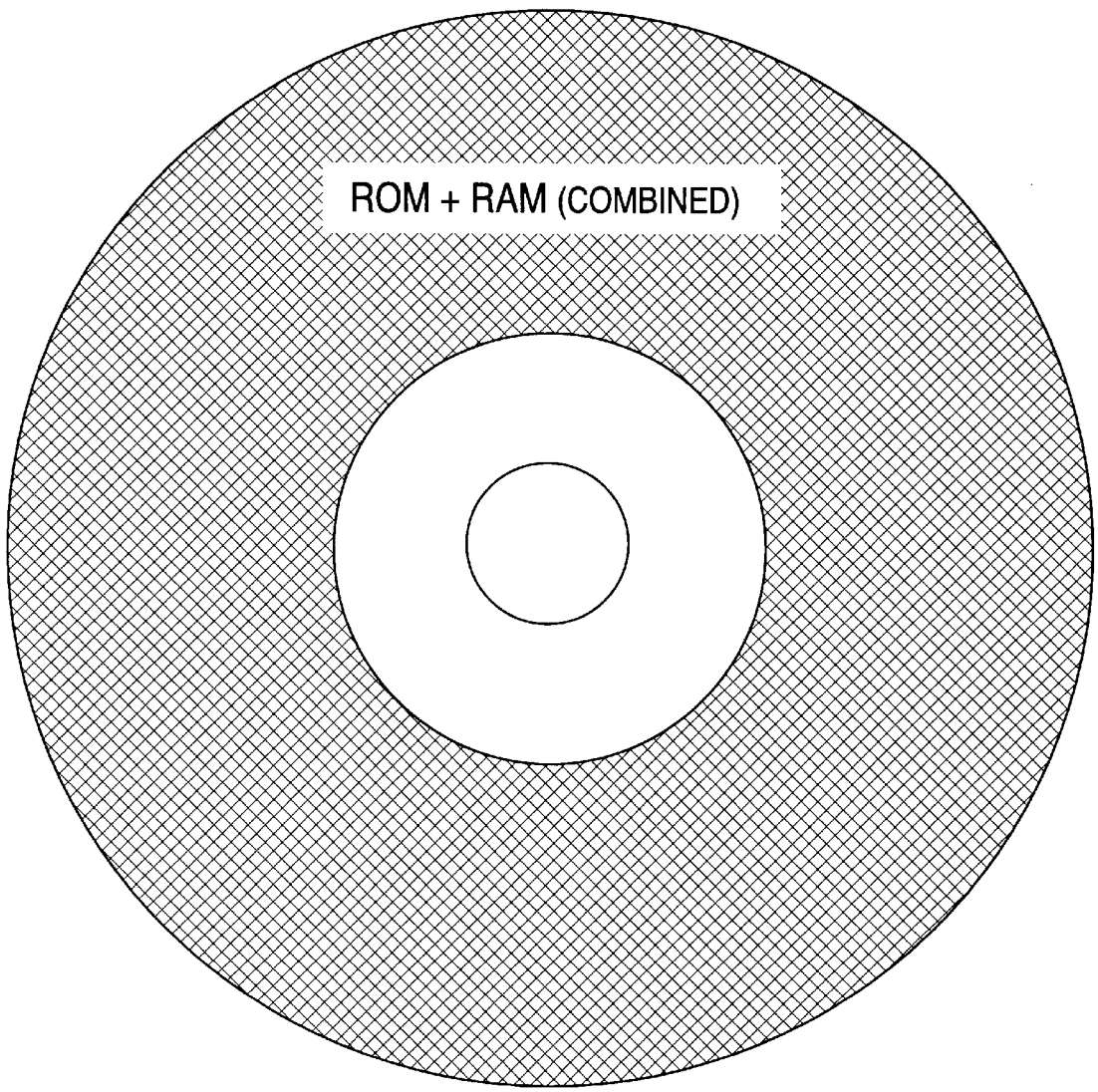
FIG. 3 shows an outline sketch of the memory area distribution of a second ROM-RAM information medium.

According to a first design, FIG. 2 shows the memory area distribution of a first ROM-RAM information medium or a first ROM-RAM disk, and FIG. 3 shows the memory area distribution of a second ROM-RAM information medium or a second ROM-RAM disk. The ROM-RAM information media which are illustrated as outline sketches in FIGS. 2 and 3 have a centre hole in the inner region for centring the information medium in a playback and/or recording apparatus, adjacent to which there is an area which is provided in accordance with common standardization for clamping-in purposes and is likewise not provided for information storage. Only the area beyond a radius R of approximately 25 mm is thus provided for information storage and information reproduction. The ROM-RAM disk of the first design according to FIG. 2 initially has an area beyond the radius R provided for information storage and information reproduction, and the corresponding diameter, which area contains either exclusively magnetic domains or exclusively pits, that is to say either a ROM or a RAM. Adjacent to this first memory area there is then a second memory area ROM-RAM which has both pits and magnetic domains superimposed in a spiral track, which domains form the actual ROM-RAM memory area. In order to able to use the elements of known recording and reproduction devices advantageously and nevertheless to be able to implement a comparatively high memory capacity, a memory area distribution having ROM memory in the inner area is preferably selected, so that a rotation speed of approximately 500 rpm can be used. This corresponds to the rotation speed of a CD in the inner area, a linear velocity of approximately 1.2 m/s being implemented. Since this linear velocity is not sufficient for separation of ROM information or RAM information from a ROM-RAM information signal mixture, the ROM-RAM area is provided only beyond a radius R or diameter at which a linear velocity of more than 1.8 m/s is achieved at a constant rotation speed. This value occurs beyond a radius R of approximately 40 mm, as is clearly illustrated in FIG. 1. Although the recording medium is not completely provided as ROM-RAM in terms of the available memory area, a comparatively greater memory capacity is achieved. This is as a result, in particular, of the length of the memory structure required for scanning signal separation and of a necessary scanning velocity which is higher than in the case of an information medium having exclusively ROM or RAM memory areas.

From FIG. 1 it can be seen that, at a constant rotation speed of 500 rpm, cf. the continuous line in FIG. 1, the velocity V of 1.2 m/s which is required for only-RAM or only-ROM memory areas is achieved at a radius R of 25 mm, and the velocity V of 1.8 m/s which is required for writing and reading of ROM-RAM memory areas is achieved at a radius R of 40 mm According to FIG. 3, the second design is represented by a ROM-RAM disk which has both pits and domains superimposed in the entire available memory area on a spiral track, which domains form a ROM-RAM information medium. The ROM-RAM disk is written to at a constant linear velocity of only 1.2 m/s and is also read at only this linear velocity, although this velocity is actually too low for separation of a ROM signal or a RAM signal from a ROM-RAM signal mixture. Nevertheless, simultaneous reading of ROM and RAM and reading of the ROM area and writing to the RAM area at the same time, and an even greater memory volume are achieved, in that the data clock rate of the RAM information is reduced. The reduction in the clock rate leads to longer memory structures, so that the length of the memory structures required to separate a ROM signal or a RAM signal from a ROM-RAM signal mixture is achieved. The memory volume is further increased. This is shown by a simple comparison. In the case of an inner radius Ri of the memory area of 25 mm and an outer radius Ra of the memory area of 75 mm, this results, in the case of CLV or a constant linear velocity, in an effectively used area A of $A = \pi p Ra^2 - \pi p Ri^2 = \pi p \, 5000 \text{ mm}^2$.

Since it can be assumed that, at a constant clock rate or data rate and using CAV or a constant rotation speed, the inner radius Ri governs the quantity of stored information per track, the memory volume available in each track is only as much as in the first track. Considered from the point of view of memory volume, all tracks are in consequence identical. This results in an effectively used area A of $A = 2\pi p Ri(Ra - Ri) = \pi p \, 2500 \text{ mm}^2$.

In consequence, the memory volume in the case of CLV is greater than in the case of CAV, so that a further advantage can be recorded.

We claim:

1. ROM-RAM disk comprising:

superimposed ROM and RAM memory areas memory structures for the superimposed ROM and RAM memory areas are contained in an outer area beyond a predetermined radius, and memory structures for RAM memory areas or for ROM memory areas having pits are contained in an area within the predetermined radius.

2. RQM-RAM disk according to claim 1, wherein the predetermined radius is defined so that the disk has a scanning rate of at least 1.8 m/s at the predetermined radius and at a constant rotational speed.

3. Method for reading ROM memory structures and for the simultaneous reading or writing of RAM memory structures, comprising the steps of:

the ROM memory structures and the RAM memory structures are contained on a ROM-RAM disk, the RAM memory structures are written only in an outer area beyond a predetermined radius, and the disk is driven at a constant rotational speed, wherein the constant rotational speed is about 500 rpm.

4. ROM-RAM disk comprising:

superimposed ROM and RAM memory areas; and memory structures for the superimposed ROM and RAM memory areas which respectively have different minimal lengths, the minimal length of memory structures for the RAM memory area being greater than the minimal length of memory structures for the ROM memory area.

* * * * *